United States Patent
Turner

(10) Patent No.: US 10,654,203 B2
(45) Date of Patent: May 19, 2020

(54) METHOD FOR PRODUCING AN APPARATUS FOR DISPENSING A MEDIUM

(71) Applicant: Sulzer Mixpac AG, Haag (CH)

(72) Inventor: Hayden Turner, Buchs SG (CH)

(73) Assignee: SULZER MIXPAC AG, Haag (CH)

( * ) Notice: Subject to any disclaimer, the term of this patent is extended or adjusted under 35 U.S.C. 154(b) by 540 days.

(21) Appl. No.: 15/505,127

(22) PCT Filed: Aug. 20, 2015

(86) PCT No.: PCT/EP2015/069182
§ 371 (c)(1),
(2) Date: Feb. 20, 2017

(87) PCT Pub. No.: WO2016/026941
PCT Pub. Date: Feb. 25, 2016

(65) Prior Publication Data
US 2017/0266858 A1    Sep. 21, 2017

(30) Foreign Application Priority Data

Aug. 21, 2014    (EP) .................................... 14181764

(51) Int. Cl.
*B29C 45/16*    (2006.01)
*B29C 45/14*    (2006.01)
(Continued)

(52) U.S. Cl.
CPC .. *B29C 45/14065* (2013.01); *B29C 45/14336* (2013.01); *B29C 45/16* (2013.01);
(Continued)

(58) Field of Classification Search
None
See application file for complete search history.

(56) References Cited

U.S. PATENT DOCUMENTS 5,927,567 A * 7/1999 Fillmore ............... B29C 43/146
222/490
6,216,493 B1 * 4/2001 Weston .................. A61M 5/30
65/68
(Continued)

FOREIGN PATENT DOCUMENTS

EP      2428282 A1    3/2012
WO   2012087631 A1    6/2012

OTHER PUBLICATIONS

Extended European Search Report dated Feb. 17, 2015 in corresponding European Patent Application No. 14181764.3.
(Continued)

*Primary Examiner* — Edmund H Lee
(74) *Attorney, Agent, or Firm* — Global IP Counselors, LLP

(57) ABSTRACT

A method is disclosed for producing an apparatus for dispensing a medium. The apparatus includes a cartridge in which a piston is movably receivable. The cartridge includes a cartridge body and a cartridge cover together forming a cartridge housing. The method includes providing a first part in a mold of a molding device, the first part being chosen from at least one of the following parts: cartridge body; piston; cartridge cover. Subsequently, a second part different from the first part is molded in the mold of the molding device, the first part constituting a part of the mold for the second part.

24 Claims, 3 Drawing Sheets

(51) Int. Cl.
  *B29L 31/00* (2006.01)
  *B29K 77/00* (2006.01)
  *B29K 101/12* (2006.01)
  *B29K 105/00* (2006.01)

(52) U.S. Cl.
  CPC .. *B29C 2045/1601* (2013.01); *B29K 2023/06* (2013.01); *B29K 2077/00* (2013.01); *B29K 2101/12* (2013.01); *B29K 2105/0067* (2013.01); *B29L 2031/712* (2013.01); *B29L 2031/715* (2013.01)

(56) References Cited

U.S. PATENT DOCUMENTS

| | | | | |
|---|---|---|---|---|
| 7,022,277 B2* | 4/2006 | Bosshardt | ............. | B29C 43/146 264/242 |
| 7,757,370 B2* | 7/2010 | Griffiths | .............. | A61M 5/2066 264/251 |
| 7,790,257 B2* | 9/2010 | Skigen | ................ | B29C 45/1675 222/325 |
| 7,891,528 B2* | 2/2011 | Costa | ................. | A61M 5/31511 222/386 |
| 7,947,146 B2* | 5/2011 | Skigen | ................ | B29C 45/1675 156/304.1 |
| 8,071,001 B2* | 12/2011 | Boucherie | .......... | A61M 5/31511 264/255 |
| 2012/0061424 A1 | 3/2012 | Obrist | | |

OTHER PUBLICATIONS

Tilo Vaahs: "Medizintechnik für den Massenmarkt", Oct. 30, 2000, pp. 242-244, XP055168008.

David Raia: "Factors That Affect Performance of Overmolding Bond Strength", Jun. 11, 2011, 11 pages.

International Preliminary Report on Patentability and Written Opinion dated Feb. 21, 2017 in corresponding International Application No. PCT/EP20151069182, filed Aug. 20, 2015.

* cited by examiner

METHOD FOR PRODUCING AN APPARATUS FOR DISPENSING A MEDIUM

CROSS-REFERENCE TO RELATED APPLICATIONS

This application is a U.S. National Stage application of International Application No. PCT/EP2015/069182, filed Aug. 20, 2015, which claims priority to EP Application No. 14181764.3, filed Aug. 21, 2014 the contents of each of which are hereby incorporated herein by reference.

BACKGROUND

Field of Invention

The present invention is related to a method for producing an apparatus for dispensing a medium, and to an apparatus produced with the method.

Background Information

It is known in the art to fill a cartridge of such an apparatus by front filling the cartridge through an outlet for dispensing the medium. Alternatively, cartridges are often filled through an inlet arranged on a filling side, which is usually arranged at an end of the cartridge that is arranged opposite to the outlet of the cartridge; this is usually called back filling.

Usually, the cartridge and a piston to be received in the cartridge in a movable manner are produced separately with an injection molding process. After production, for the front-filling procedure the piston is inserted into the cartridge and moved to a filling position. In the filling position, a conveying side of the piston for dispensing the medium from the cartridge is in contact with an outlet face of the cartridge; thereby a residual volume can be often formed between the conveying side of the piston and the outlet face.

It is further known in the art as e.g. disclosed in EP 2 428 282 A1 that air can be trapped in the cartridge before or during the filling process. The trapped air can be detrimental inter alia to the dispensing quality and accuracy. Hence, a venting mechanism is often arranged in the piston to remove the trapped air after the filling process.

Although the known solutions for venting trapped air work reliably and effectively, these solutions are sometimes too costly for certain, cost-critical applications. Furthermore, the presence of the venting mechanism sometimes provides a residual volume for air to be trapped, which cannot be removed after the filling.

A prior art method of making a valve of a dispensing device for dental substances is known from WO2012/087631 A1.

The article by Tilo Vaahs titled: "Medizintechnik für den Massenmarkt" (medical technology for the mass marked) published in KU Kunstoffe, Jahrg. 90 (2000) 10, pages 242-244, relates to plastic packaging that can be used for drugs and drug dosage systems, such as insulin. Having regard to medical technology POM and PBT are cited as being suitable in the medical field as packaging materials.

The article by David Raia: "Factors That Affect Performance of Overmolding Bond Strength" published in ANTEC 2011/2527 on Jun. 1, 2011, relates to the overmolding of different components relative to one another and specifies different bond strengths between different materials for specific thermoplastics that can be used as medical equipment housings.

To prevent air to be trapped in the cartridge during the filling process, it is also known in the art to apply a vacuum to the cartridge and subsequently fill the cartridge with the medium. This has the disadvantage of making the filling process more cumbersome and costly.

SUMMARY

Moreover, the step of inserting the piston into the cartridge is critical with regard to damaging the piston's sealing lip if not done properly, which can finally result in a leaky apparatus.

It is thus an object of the present invention to overcome the above-mentioned drawbacks, in particular to provide a method for producing an apparatus for dispensing the medium and the apparatus produced by said method to allow for the apparatus to be filled with a front-filling procedure while minimizing the amount of gas that can be trapped in the apparatus before and during the filling procedure. A further object is in particular to provide a method for producing the apparatus in a cost efficient manner, wherein the apparatus can be safely and reliably operated.

These objects are met by the method for producing the apparatus and the apparatus produced by said method according to the independent claims.

Advantageous embodiments of the present invention are described herein.

The invention is related to a method for producing an apparatus for dispensing a medium. The apparatus comprises a cartridge in which a piston is movably receivable. The cartridge comprises a cartridge body and a cartridge cover together forming a cartridge housing, wherein, in particular, the cartridge body is a tube-like or pipe-like cartridge body and the cartridge cover is a frontal end cover of the cartridge body. The method comprises the step of providing a first part in a mold of a molding device, wherein the first part is chosen from at least one of the following parts: cartridge body; piston; cartridge cover. In particular, an outlet is arranged in an outlet face of the cartridge cover for conveying the medium into the cartridge and/or for dispensing the medium from the cartridge.

Subsequently, a second part different from the first part is molded in the mold of the molding device, wherein the first part constitutes a part of the mold for the second part.

This process has the advantage that the first and second parts can be formed such that they have at least partially substantially matching shapes. If the first and second parts are the piston and the cartridge cover this results in a reduced residual volume between the cartridge cover and the piston such that substantially no gas, in particular air, can be trapped in the apparatus. Further, since no additional venting device has to be arranged in the piston to be operated by a user and no vacuum has to be applied, the apparatus can be safely and reliably operated.

As is known in the art, a mold or tool of a molding device comprises a molding cavity to be filled with a medium to mold a part. In the context of the present invention, the phrase that a "first part constitutes a part of the mold for a second part" means that the first part defines a boundary for the second part and/or that the second part is molded at least partly around or within the first part; within this meaning, the first part forms at least a part of the mold for a subsequent molding step of the second part and optionally a further or previous molding step of a third part.

In the context of the present invention, the term "conveying side" has the meaning of the side of the piston that is in contact with the medium at intended use; the term "drive side" has the meaning of the side of the piston at which force is applied to move the piston towards the outlet face and to dispense the medium.

In the context of the present invention, the term that "substantially no gas can be trapped" has the meaning that apart from production tolerances, substantially no residual volume remains for the gas at least between the outlet face and the conveying side when the piston is in the filling position.

It is preferred when the cartridge body is permanently bonded to the cartridge cover. Thereby the only moveable part of an apparatus obtained in accordance with the invention is the piston. Moreover, permanently bonding the cartridge cover to the cartridge body also helps ensure that no air can enter into such an apparatus at this bond.

Preferably, the first part, second part and third part are chosen from one of the following parts: piston; cartridge cover, cartridge body.

The filling position is considered to be the position of the piston in the context of the present invention when the piston is moved as far as possible at intended use towards the outlet face.

The molding process used to produce at least one of the parts can be for example a compression molding process, an injection molding process, an extrusion molding process or a thermoforming process or any combination thereof.

Preferably the first part is the piston that is molded in a piston molding position in the molding device in a piston molding step. The piston is frequently made from a material that has a higher melting temperature than the cartridge body and/or the cartridge cover, so that producing the piston as a first part ensures that the cartridge cover and/or the cartridge body are not permanently bonded to the piston on selection of these materials, or worse, become defective during the molding procedure.

In a preferred embodiment the first part is formed by molding in the mold. It is, however, also possible that the first part is molded in a first mold different from the mold in which the second part is molded. In this case, after having molded the first part, the first part is moved from the first mold to the mold for the second part to constitute a part of this mold for the second part.

In a preferred embodiment, a third part different from the first part and the second part is molded in the mold, wherein the first part and/or second part constitute a part of the mold for the third part.

This process has the advantage that at least two different parts and preferably all the parts can be produced by molding in a single molding device, either in the same mold using different inserts or in different molds of the same molding device, which makes the production more cost efficient.

In particular, the first part is the piston, the second part the cartridge cover and the third part the cartridge body. It has to be noted that the adjectives first, second and third are only used to distinguish between the different parts and do not necessarily indicate the order of production of those parts.

It is also possible that the first part is the cartridge body, the second part the piston and the third part the cartridge cover or that the first part is the cartridge cover, the second part the piston and the third part the cartridge body.

In a preferred embodiment, the piston constitutes a part of the mold for the cartridge body and/or cartridge cover.

Preferably the piston is disposed in a cartridge body molding position in the molding device in which the piston constitutes a part of the mold for the cartridge body in a cartridge body molding step and the piston is subsequently moved from the cartridge body molding position to a cartridge cover molding position in the molding device to carry out a cartridge cover molding step in which the piston also constitutes a part of the mold for the cartridge cover.

Advantageously the cartridge body is permanently bonded to the cartridge cover in the cartridge cover molding step.

It is preferred when a temperature during the cartridge body molding step is substantially the same as a temperature during the cartridge cover molding step.

Preferably the temperature relates to a melting temperature of a material used to form both the cartridge body and the cartridge cover, with the melting temperature being lower than a melting temperature of the material used to form the piston.

Permanently bonding the cartridge cover to the cartridge body ensures the reproducible formation of cartridges. Selecting the material to be the same for both components, on the one hand, means that the reservoir of injection molded material and the process parameters such as temperature need not be changed during these two molding steps.

On the other hand, it ensures a good permanent bond between the components as e.g. the same temperature can be used to bond the two components together as is required for the formation of the components.

In another preferred embodiment, the cartridge cover constitutes a part of the mold for the piston and/or the cartridge body.

This structure has inter alia the advantage that the conveying side of the piston and the outlet face of the cartridge cover are formed such that they have substantially matching shapes. Since the unwanted gas is usually trapped between the conveying side of the piston and the outlet face of the cartridge cover, the residual volume for the gas can be minimized; this can increase the reliability and accuracy of the dispensing process.

Usually, a lip seal is arranged circumferentially at a side wall of the piston. The lip seal is used to provide a fluid-tight sealing between the piston and an inner wall of the cartridge body. To ensure a fluid-tight sealing, such a lip seal has a certain flexibility of movement to be deflected. To allow for such flexibility, a piston-recess is formed between the side of the lip seal facing the outlet face and the side wall of the piston. A protrusion arranged on the outlet face can reliably engage the piston-recess. The protrusion and the lip seal are producible in a cost efficient manner by molding. Often, the protrusion can be formed as a ring or ridge engaging a ring-like piston-recess of the cylinder-like piston. In a preferred embodiment, the cartridge body is formed substantially as a tube at least in the section of the cartridge in which the piston is movably receivable.

In a preferred embodiment, the cartridge cover, the piston and the cartridge body are formed by molding in the same mold of the same molding device. This process allows for an even more cost efficient production process while minimizing the residual volume for gas to be trapped. In addition, the assembly of the apparatus can be reliably conducted while minimizing the risk for damaging the seal when inserting the piston into the cartridge, which is sometimes a problem in the state of the art.

In particular, the mold comprises a first molding cavity for the first part, a second molding cavity for the second part and a third molding cavity for the third part. Alternatively, the mold comprises in particular a single molding cavity which is adapted with inserts for the different molding steps for molding the first part, the second part and the third part, wherein the first part and/or the second part and/or the third part may be used as an insert in the mold for adapting the molding cavity of the mold. In a further alternative embodiment, the molding device comprises in particular a first mold for the first part, a second mold for the second part and a third mold for the third part, wherein each of the first, the second and the third mold comprise each a molding cavity.

In a preferred embodiment, the molding process is an injection molding process. This process allows for a cost efficient production of the parts in a reliable manner.

In a preferred embodiment, the material properties melting temperature and/or polarity of the material used for the parts to be molded are chosen such that a permanent bond is formed during molding between at least two parts chosen from the first part, the second part and the third part. In other words, the material properties can be chosen such that a permanent bond is formed during molding at least between one of the following pairings: first part and second part; first part and third part; second part and third part.

In a preferred embodiment, the material properties melting temperature and/or polarity of the material used for the parts to be molded are chosen such that no permanent bond is formed between at least two parts chosen from the first part, the second part and the third part. In other words, the material properties can be chosen such that no permanent bond is formed during molding at least between one of the following pairings: first part and second part; first part and third part; second part and third part.

This has the advantage that depending on the order of the molding process of the different parts, the material properties can be chosen as required. For instance, the piston should be movable in the cartridge. Hence, the material properties can be chosen such that the creation of a permanent bond between the piston on the one hand and the cartridge cover and the cartridge body on the other hand is prevented. Further, the creation of a permanent bond between the cartridge cover and the cartridge body is often required. Hence, the material properties can be chosen accordingly.

In a preferred embodiment, the melting temperature of the material for the first part is higher than the melting temperature of the material for the second part. In particular, the melting temperature of the material for the first part is higher than the melting temperature of the material for the third part.

This has the advantage that the second part, which is molded with the first part constituting a part of the mold for said second part, does not melt the first part during the molding process; thus, no permanent bond between the two parts is created. Further, since during injection molding the resin is usually injected with high pressure, melting of the first part constituting a part of the mold for the second part should be avoided to guarantee the necessary stability of the mold. It is of course also possible to choose the melting temperatures of the materials used during the molding process such that a permanent bond between the parts is created, if required.

For instance, if the first part is the piston, the material for the piston is chosen to have a higher melting temperature than the material for the cartridge cover and/or the cartridge body. During the molding process, the temperature for molding the cartridge cover and/or the cartridge body is kept below the melting temperature of the piston and equal to or above the melting temperature of the cartridge body and/or the cartridge cover.

Preferably, the cartridge cover has a melting temperature that is equal to or higher than the melting temperature of the cartridge body. This has the advantage that during the molding of the cartridge cover it is possible to create a permanent bond between the cartridge cover and cartridge body, if the cartridge body constitutes a part of the mold for the cartridge cover. For this, the piston should be moved into the cartridge body to the filling position before starting the molding process for the cartridge cover.

In a preferred embodiment, the melting temperature of the material for the second part is higher than the melting temperature of the material for the third part, in particular if the second part constitutes a part of the mold for the third part and if no permanent bond between the second and the third part should be created.

In a preferred embodiment, the melting temperature of the material for the second part is substantially equal to or lower than the melting temperature of the third part, in particular if the second part does not constitute a part of the mold for the third part or if a permanent bond between the second and the third part should be created.

This has the advantage that the same material can be used for the second and third part, thus making the molding process more cost efficient, since fewer different materials have to be stored at the production facility. In addition, since the same parameters for the molding process can then be used for these parts, the molding process becomes easier to operate.

In a preferred embodiment, the parts comprise Polyethylene (PE), Polybutylene terephthalate (PBT), Polypropylene (PP), Polyamide (PA) or Polyoxymethylene (POM) or any mixture thereof. In particular, the parts essentially consist of Polyethylene (PE), Polybutylene terephthalate (PBT), Polypropylene (PP), Polyamide (PA) or Polyoxymethylene (POM) or any mixture thereof.

Naturally, if a part essentially consists of Polyethylene (PE), Polybutylene terephthalate (PBT), Polypropylene (PP), Polyamide (PA) or Polyoxymethylene (POM), said materials may comprise typical additives like dyes, stabilizers or nucleating agents or any mixture thereof.

In a preferred embodiment, the first part comprises Polyamide (PA). In particular, the first part essentially consists of Polyamide (PA).

In a preferred embodiment, the first part comprises Polybutylene terephthalate (PBT). In particular, the first part essentially consists of Polybutylene terephthalate (PBT).

In a preferred embodiment, the second part and/or the third part comprise Polypropylene (PP) or Polyethylene (PE) or any mixture thereof. In particular, the second part and/or the third part essentially consist of Polypropylene (PP) or Polyethylene (PE) or any mixture thereof.

In particular, a part essentially consists of Polyethylene (PE), Polybutylene terephthalate (PBT), Polypropylene (PP) or Polyamide (PA) or any mixture thereof, when the part comprises at least 80 weight-%, preferably at least 90 weight-% and more preferably at least 95 weight-% of Polyethylene (PE), Polybutylene terephthalate (PBT), Polypropylene (PP) or Polyamide (PA) or any mixture thereof.

The use of Polyethylene (PE), Polybutylene terephthalate (PBT), Polypropylene (PP) or Polyamide (PA) has the advantage that these materials are readily available at low costs. In addition, the melting temperatures of these materials can be adjusted in certain ranges, wherein the different materials each have different temperature ranges for the melting temperatures. This has the advantage that the required melting temperatures of the materials can be chosen for a certain application in a flexible manner. It should be noted that the respective mold of the molding device can be selected from the group of molds comprising a piston mold, a cartridge body mold and a cartridge cover mold.

Preferably the piston mold is used in a piston molding step, the cartridge body mold is used in a cartridge body molding step and the cartridge cover mold is used in a cartridge cover molding step.

Advantageously one molding device is used to provide the piston mold, the cartridge body mold and the cartridge cover mold, by providing inserts specific to the mold of the component to be manufactured in the molding device.

A further aspect of the present invention relates to an apparatus comprising a cartridge and a piston that are produced with a method as described above. Preferably the cartridge of the apparatus is filled with substances, in particular with impression materials, adhesives, bonding materials, materials for chemical anchorings or protective coatings materials.

Typical cartridge sizes are for example between 2.5 ml to 1500 ml. While the entrapped air problem is usually more relevant for larger cartridges (100 ml and above) the advantages of the inventive assembly method might be more important with smaller cartridges. The corresponding smaller pistons are usually simpler in geometry and have more robust sealing lips which can be advantageous for the present invention.

The media to be dispensed are typically used as impression materials, e.g. on the formation of dental impressions, as a cement material for prosthetic restorations, as a temporary cement for trial cementing restorations or for cementing temporary crowns. Further applications are in the building industry where they are e.g. used as a replacement for mechanical joints that corrode over time. Adhesive bonding can be used to bond products such as windows and concrete elements. The use of protective coatings, for example moisture barriers, corrosion protection and anti-slip coatings, is also becoming increasingly common. Examples of flowable media which can be used are, for example, distributed by the company Coltene using the tradename AFFINIS® or by the company DMG using the tradename PermaCem.

BRIEF DESCRIPTION OF THE DRAWINGS

Referring now to the attached drawings which form a part of this original disclosure.

DETAILED DESCRIPTION OF THE EMBODIMENTS

Figure 1:
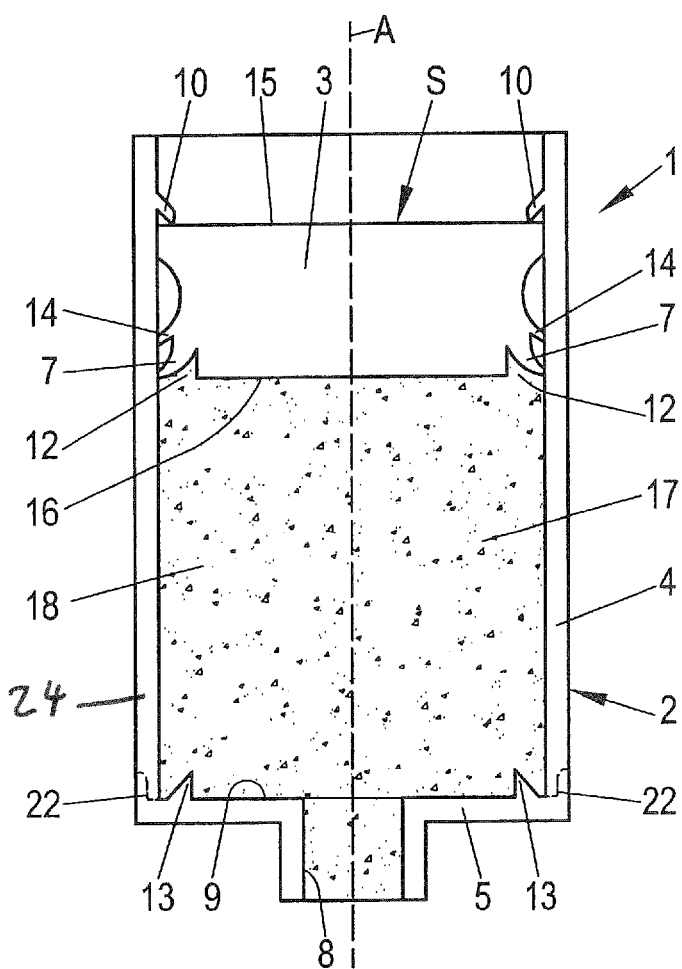
FIG. 1 is a schematic view of an apparatus for dispensing a medium produced with a method according to the present invention.

FIG. 1 shows an apparatus 1 for dispensing a medium 18. The apparatus 1 comprises a cartridge 2, in which a piston 3 is arranged. The piston 3 is movable substantially along a longitudinal axis A of the cartridge 2. The cartridge 2 is formed tube-like at least in the section in which the piston 3 is movably receivable. Further, the cartridge 2 comprises a cartridge housing 24 formed from a cartridge body 4 and a cartridge cover 5.

The cartridge 2 has blocking means or element 10 arranged in the cartridge 2 at an inner cartridge wall such that the piston 3 cannot be moved accidentally past the blocking element outside the cartridge 2. A protrusion 13 is arranged on the inner surface of the outlet face 9 of the cartridge 2. The protrusion is arranged in a circumferential manner and faces away from the outlet face 9 and is tapered in a direction away from outlet face 9 along the longitudinal axis A of the cartridge 2.

The cartridge 2 has a storage chamber 17 for receiving the medium 18 to be dispensed. The size of the storage chamber 17 depends on the position of the piston 3. The dotted area is filled with medium 18.

The piston 3 has a drive side 15 and a conveying side 16. For dispensing the medium, a pressure is applied to the drive side 15 either in a manual or motorized manner. The piston 3 further has a seal 7, which is formed as a lip seal; the lip can be deflected in a flexible manner to ensure a fluid-tight sealing. The seal 7 is arranged at a side wall of the piston in a circumferential manner for providing a fluid-tight sealing between the piston 3 and the inner cartridge wall, such that no medium can pass along the side wall of the piston 3 from the conveying side 16 to the drive side 15.

The piston 3 has a piston-recess 12 formed between the side wall and the seal 7. For an improved sealing, the piston 3 has a further seal 14, which is also formed as a lip seal.

According to FIG. 1, the piston 3 is arranged in the filled position S, which represents the position of the piston 3 farthest away from the outlet face 9. Hence, the size of the storage chamber 17 is maximized for receiving the medium 18.

When a force is applied to the piston 3 in a direction towards the outlet face 9, medium 18 is dispensed from the cartridge 2 through an outlet 8 arranged in the outlet face 9. The dispensing process can continue until the piston 3 comes into contact with the outlet face 9.

Figure 2:
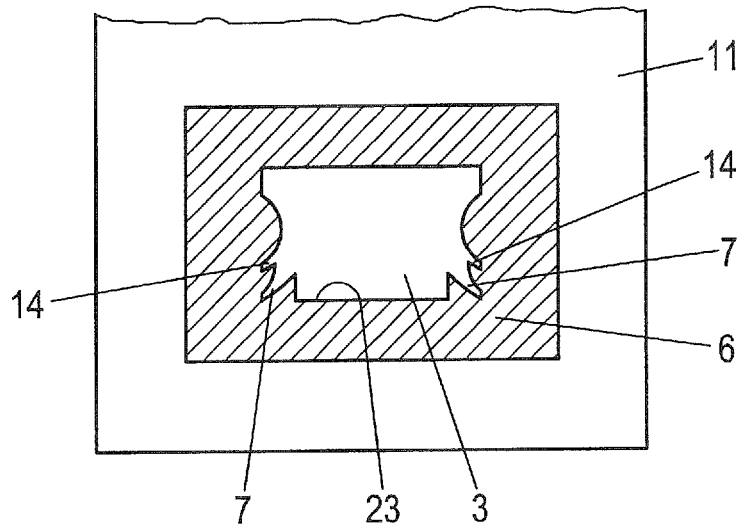
FIG. 2 is a schematic view of a molding device with a piston in a first production step.

FIG. 2 shows a schematic view of the piston 3 arranged in a mold 6, such as a piston mold, of a molding device 11 in a first production step. The piston 3 occupies a molding cavity 23 of the mold 6 after production of the piston 3.

Parts denominated with the same reference numeral relate to the same feature in all the figures and are only explained again when needed.

The piston 3 was produced with an injection molding process in the mold 6 of the molding device 11. This is a production process well known to the skilled artisan. Naturally, the piston 3 could also be provided e.g. from a different production process.

Figure 3:
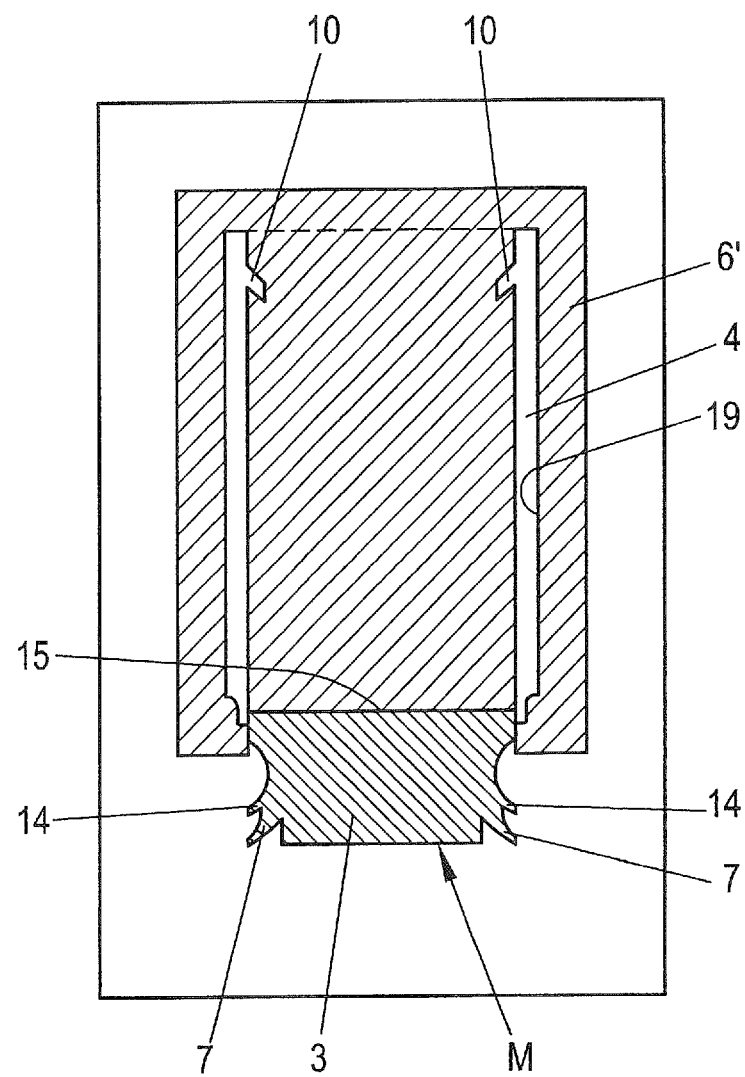
FIG. 3 is a schematic view of a molding device with the piston and a cartridge body in a second production step.

For a further production step as depicted schematically in FIG. 3, the piston 3 is arranged in a second mold 6', such as a cartridge body mold, in a molding position M. The piston 3 can for example have been transferred from the mold 6 to the second mold 6' which may be part of the same molding device 11 or of another molding device. It is also possible that mold 6 and mold 6' are identical and that only different inserts are used to amend the shape of the mold for the different molding steps. After arranging the piston 3 in the molding position M, a further injection molding step is conducted to fill a cavity 19 and thus to produce the cartridge body 4 with the blocking element 10. As can be seen from FIG. 3, the piston 3 constitutes a (small) part of the mold 6 for the cartridge body 4. Thereby it is achieved that after production of cartridge body 4 the piston 3 is already positioned with its drive side 15 within cartridge body 4. A subsequent additional step for centering and inserting piston 3 into cartridge body 4 can thus be avoided.

Figure 4:
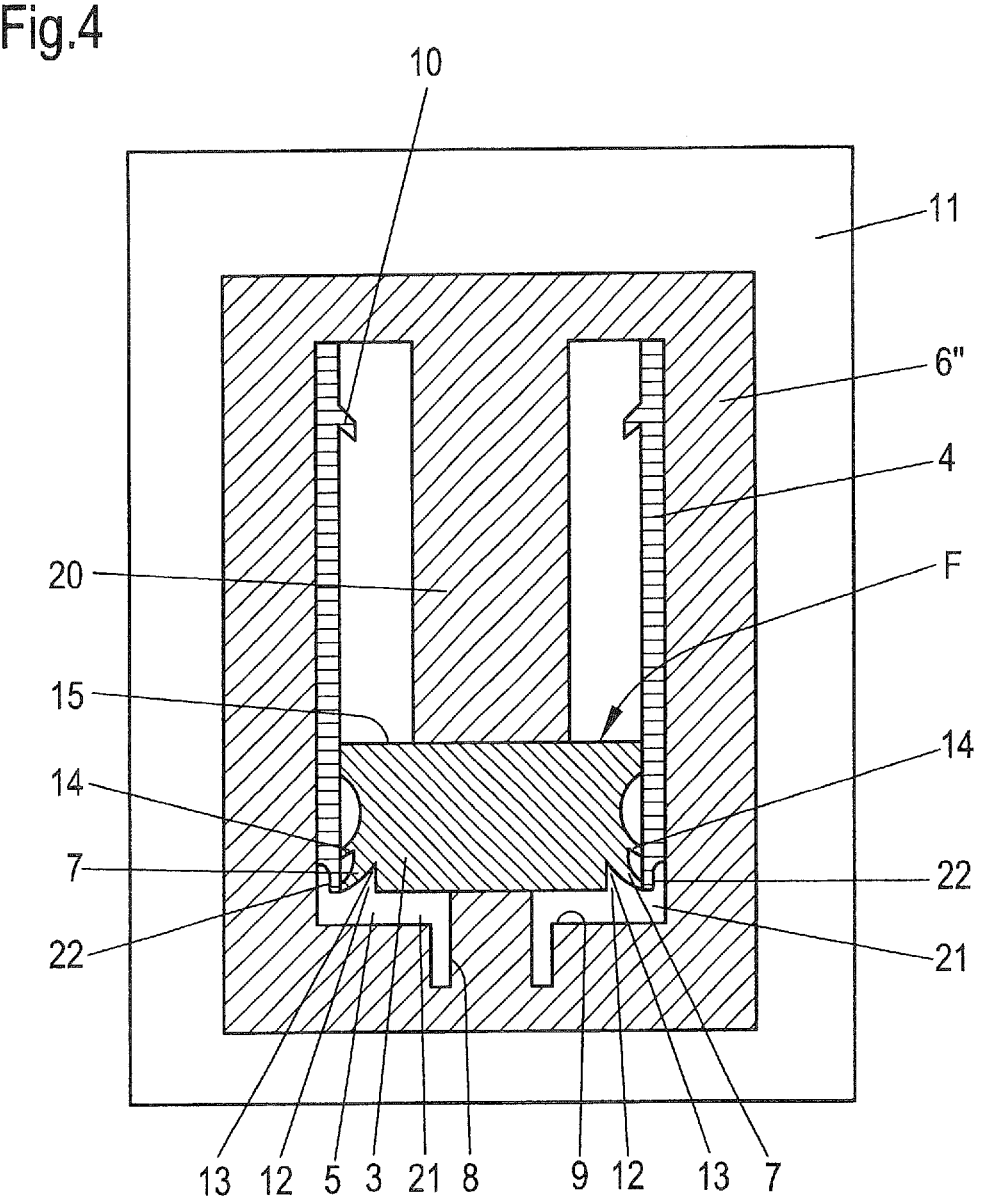
FIG. 4 is a schematic view of a molding device with the piston, the cartridge body and a cartridge cover in a third production step.

For a further production step as depicted schematically in FIG. 4, the piston 3 is arranged in a third mold 6", such as a cartridge cover mold, in a filling position F. Similar to the above description the cartridge body 4 with the piston 3 may have been transferred to another mold 6" provided in the same or in another molding device or the mold 6" is identical to mold 6' and different inserts are used to amend the shape of the mold for the different molding steps. In both cases the piston 3 has been moved into the already molded cartridge body 4 that it reaches the filling position F in which it is held by holding means or element 20. Since the piston 3 is already centered with its drive side 15 within the cartridge body 4 and since the seals 7 and 14 are arranged to point away from the moving direction of the piston 3 the risk for damaging the seals 7 and 14 during movement of the piston 3 is minimized. Subsequently, a further injection molding step is conducted to produce the cartridge cover 5 for forming the complete cartridge 2. Thereby the piston 3 and the cartridge body 4 constitute a part of the mold 6" for the cartridge cover 5.

During this injection molding step a ring-shaped cavity 21 is filled with melted material which means that also the piston-recess 12 is completely filled. In this way the cartridge cover 5 and in particular the protrusion 13 is formed such that substantially no air is trapped between the outlet face 9, the conveying side 16 of the piston 3 and the side of the seal 7 facing the outlet face 9.

Thus, the components of an apparatus, namely the piston 3, the cartridge body 4 and the cartridge cover 5 can be molded in one and the same molding device 11, using inserts specific to the mold 6, 6', 6" of the component to be manufactured in the molding device 11.

The inserts have a shape that is adapted not only to a shape of the molding device 11, i.e. the inlet for a material of the component to be formed that is to be injected into the mold 6, 6', 6", any connections for vacuum apparatus (not shown) that may be required during the molding process, but also to the outer and inner contours of the respective component to be manufactured in the mold 6, 6', 6" respectively inserted in the molding device 11.

For example, the piston mold 6 may have cutouts for the seals 7, 14 and at least one protrusion for the piston recess 12. Likewise the cartridge body mold 6' may have at least one cutout for the blocking element 10. In the same way the cartridge cover mold 6" can have cutouts for the outlet 8 from the cartridge. These cutouts and protrusions are respectively formed in the inserts specific to the respective mold 6, 6', 6".

Preferably the piston 3 essentially consists of a material having a melting point which lies above the melting point of the material of the cartridge body 4 and the cartridge cover 5, for example of Polyamide (PA). Further preferably, the cartridge cover 5 and the cartridge body 4 essentially consist of a material having the same melting temperature, for example of Polyethylene (PE). Since the melting temperature of the piston 3 is higher than the melting temperature of the cartridge cover 5 and the cartridge body 4 during the injection molding of the cartridge cover 5 and the cartridge body 4 the temperature of the material for the cartridge cover 5 and the cartridge body 4 is kept lower than the melting temperature of the piston 3. This prevents a permanent bond between the piston 3 on the one hand and the cartridge cover 5 and the cartridge body 4 on the other hand, such that the piston 3 is movable within the cartridge 2.

Furthermore, additional properties like the polarity of the chosen materials may aid in preventing the creation of a permanent bond between the piston 3 and the cartridge cover 5 and the cartridge body 4, such that the piston 3 is movable within the cartridge 2.

The temperature of the material for the cartridge cover 5 and the cartridge body 4 is kept at such a temperature that during the injection molding process for the cartridge cover 5 a permanent bond at a boundary 22 (see also FIG. 1) between the cartridge cover 5 and the cartridge body 4 can be achieved.

The creation of a permanent bond between the cartridge cover 5 and the cartridge body 4 may be aided by the similar properties like the polarity and melting temperature of the Polyethylene (PE) used for the cartridge cover 5 and the cartridge body 4

The order of producing the piston 3, the cartridge cover 5 and the cartridge body 4 can naturally be adapted to the requirements of the finished product. For instance, it is possible to first provide or produce the cartridge body 4, then the piston 3 and subsequently the cartridge cover 5; alternatively, the cartridge cover 5 can be provided or produced first, then the piston 3 and subsequently the cartridge body 4.

The invention claimed is:

1. A method for producing an apparatus for dispensing a medium, the apparatus including a cartridge in which a piston is movably receivable, the cartridge including a cartridge body and a cartridge cover together forming a cartridge housing, the method comprising:
    providing a first part in a mold of a molding device, the first part being the piston; and
    molding a second part different from the first part in the mold of the molding device, the first part being a part of the mold for the second part and the second part being the cartridge cover.

2. The method according to claim 1, wherein the first part is formed by molding in the mold.

3. The method according to claim 1, further comprising molding a third part different from the first part and the second part in the mold, wherein at least one of the first part and second part are a part of the mold for the third part.

4. The method according to claim 1, wherein the first part is molded in a piston molding position.

5. The method according to claim 1, wherein the piston is a part of a mold for the cartridge body.

6. The method according to claim 5, wherein the piston is disposed in a cartridge body molding position in which the piston is a part of a mold for the cartridge body during molding of the cartridge body and the piston is subsequently moved from the cartridge body molding position to a cartridge cover molding position to carry out molding of the cartridge cover.

7. The method according to claim 6, wherein the cartridge body is permanently bonded to the cartridge cover during molding of the cartridge cover.

8. The method according to claim 6, wherein a temperature during the molding of the cartridge body is substantially the same as a temperature during the molding of the cartridge cover.

9. The method according to claim 8, wherein the temperature relates to a melting temperature of a material used to form both the cartridge body and the cartridge cover.

10. The method according to claim 1, wherein the cartridge cover, the piston and the cartridge body are formed by molding in the mold.

11. The method according to claim 1, wherein the molding process is an injection molding process.

12. The method according to claim 3, wherein the material properties melting temperature or a polarity of the material used for the parts to be molded are chosen such that a permanent bond is formed during molding between at least two parts chosen from the first part, the second part and the third part.

13. The method according to claim 3, wherein the material properties melting temperature or a polarity of the material used for the parts to be molded are chosen such that no permanent bond is formed between at least two parts chosen from the first part, the second part and the third part.

14. The method according to claim 1, wherein a melting temperature of the material for the first part is higher than a melting temperature of the material for the second part.

15. The method according to claim 3, wherein a melting temperature of the material for the second part is substantially equal to a melting temperature of the third part.

16. The method according to claim 1, wherein the first and second parts comprise at least one of Polyethylene (PE), Polybutylene terephthalate (PBT), Polypropylene (PP), Polyamide (PA) or Polyoxymethylene (POM) and any mixture thereof.

17. The method according to claim 1, wherein the first part comprises Polyamide (PA).

18. The method according to claim 1, wherein the second part comprises Polypropylene (PP) or Polyethylene (PE) or any mixture thereof.

19. The method according to claim 1, wherein the mold of the molding device is selected from the group of molds comprising a piston mold, a cartridge body mold and a cartridge cover mold.

20. The method according to claim 19, wherein the piston mold is used during molding of the piston, the cartridge body mold is used during molding of the cartridge body and the cartridge cover mold is used during molding of the cartridge cover.

21. The method according to claim 19, wherein the molding device is one mold and provides the piston mold, the cartridge body mold and the cartridge cover mold, by providing inserts specific to each mold to be manufactured in the molding device.

22. The method according to claim 1, further comprising wherein the piston and the cartridge body are a part of the mold for the cartridge cover.

23. The method according to claim 1, wherein the cartridge cover comprises an outlet of the dispensing device.

24. The method according to claim 1, wherein the cartridge cover comprises a protrusion arranged in a circumferential manner facing away from the piston cover.

* * * * *